United States Patent [19]

Houston et al.

[11] 3,940,620

[45] Feb. 24, 1976

[54] ELECTROSTATIC RECORDING OF X-RAY IMAGES

[75] Inventors: John M. Houston, Schenectady; James R. Young, Rexford; Nathan R. Whetten, Burnt Hills, all of N.Y.

[73] Assignee: General Electric Company, Schenectady, N.Y.

[22] Filed: Oct. 3, 1974

[21] Appl. No.: 511,615

[52] U.S. Cl........ 250/315 A; 250/213 VT; 252/501

[51] Int. Cl.$^{2}$........................................ G03B 41/16

[58] Field of Search......... 250/315, 315 A, 213 VT; 252/500, 501, 509

[56] References Cited

UNITED STATES PATENTS

| | | | |
|---|---|---|---|
| 3,436,550 | 4/1969 | Finble | 250/213 VT |
| 3,543,034 | 11/1970 | Finble | 250/213 VT |
| 3,603,790 | 9/1971 | Cleare | 250/315 A |

*Primary Examiner*—Craig E. Church
*Attorney, Agent, or Firm*—Jack E. Haken; Joseph T. Cohen; Jerome C. Squillaro

[57] ABSTRACT

A device for the electrostatic recording of X-ray images comprises two spaced electrodes with a gas-filled gap therebetween. One of the electrodes comprises a layer of an ultraviolet emitting fluorescent material and a layer of an air-exposable ultraviolet-sensitive photoemitting material. A plastic sheet is adjacent to the other electrode. An electric field is applied across the gap to accelerate photoelectrons emitted by the photoemitting material. The electrostatic image formed on the plastic sheet is developed xerographically after the exposure.

11 Claims, 1 Drawing Figure

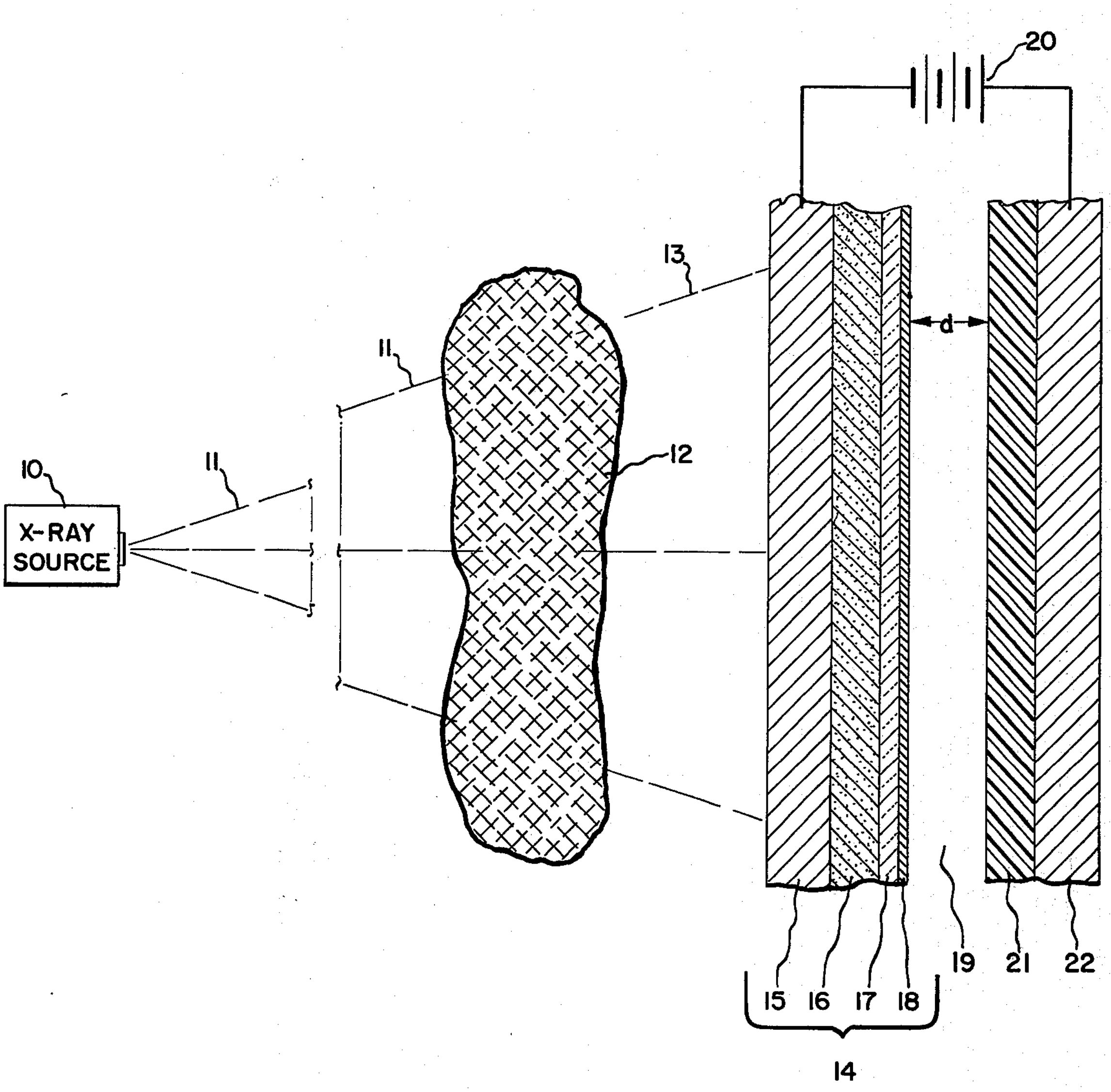
20
13
d
11
12
10
11
X-RAY SOURCE
15
16
17
18
19
21
22
14

ELECTROSTATIC RECORDING OF X-RAY IMAGES

BACKGROUND OF THE INVENTION

1. Field of the Invention

This invention relates to the imaging systems and, more particularly, to the recording of X-ray images.

2. Description of the Prior Art

In the conventional X-ray analysis of objects or tissues, an X-ray image is formed by causing X-rays to traverse the object or tissue by which the X-rays are differentially absorbed. A photographic film is then exposed to the X-ray image, either directly or through the intermediary of a fluorescent screen activated by the X-ray image. A recent system, in particular, makes use of an ultraviolet phosphor screen activated by the X-ray image, in combination with a photographic film sensitive to the ultraviolet light. However, photographic films are expensive and have limited enhancement capabilities.

One prior art arrangement for the electrostatic recording of X-ray images utilizes a cathode and an anode spaced with a gas-filled gap therebetween, with a voltage being applied across the cathode and the anode. The cathode is made of, or coated with, a heavy metal and a plastic sheet is adjacent to the anode. A pattern of X-rays is directed on the heavy metal cathode which emits phhotoelectrons in response thereto. The photoelectrons are accelerated across the gas-filled gap and strike the gas molecules, forming ion-electron pairs and producing an "avalanche effect" in the gas. As a result thereof, a pattern of electric charges corresponding to the pattern of X-rays is deposited on the plastic sheet adjacent to the anode. After exposure, the cathode is removed and the electrostatic charge on the plastic layer is developed by means of conventional xerographic techniques.

The principal disadvantage of such an arrangement is that the heavy metal directly excited by the X-rays emits a small number of photoelectrons per each incident X-ray photon. As a matter of fact, the electron escape length in all solids is much shorter than the X-ray absorption length. Hence, only those X-rays which are absorbed within a few microns of the cathode surface have the chance of producing a photoelectron. As a result thereof, the efficiency of such a heavy metal cathode is very poor, i.e., the number of photoelectrons emitted by the heavy metal cathode for each X-ray photon impinging thereupon, is low. Accordingly, the quality of the recording is poor.

Another prior art arrangement makes use of an electrode comprising a layer of a fluorescent material adjacent to a layer of a photoelectric film. The X-ray image is converted into a visible light image by means of the fluorescent material; the visible light image is converted into an electron image by means of the photoelectric film. The electrons are then accelerated by a series of focusing elements and strike on a fluorescent screen, where they produce a great-intensity image which may be easily photographed. The electrode, the focusing elements, and the fluorescent screen are enclosed within an evacuated envelope. The principal disadvantages of this arrangement are the need for an evacuated envelope which, for medical applications, must be very bulky and expensive and, moreover, the need for an expensive photographic film. It is to be noted that the photoelectric film used in the electrode of this prior art arrangement cannot be exposed to air, since it would be destroyed by oxidation. Accordingly, such an electrode cannot be used for all applications in which the electrodes must be exposed to air. In particular, it cannot be used in combination with the electrostatic recording system of X-ray images discussed above, since in that system the cathode must be removed and exposed to air for developing the image.

Another prior art arrangement consists of two planar parallel metal electrodes, with the gap between the electrodes filled with high pressure xenon gas, with an electric field applied across the gap, and with a plastic sheet adjacent to one of the electrodes. X-rays are absorbed in the xenon gas and each X-ray photon produces many electron-ion pairs. The electric field accelerates the electrons (or the ions, according to the field polarity) to the plastic sheet. The charge image on the plastic sheet is subsequently developed with conventional xerographic techniques. The principal disadvantages of this arrangement are the need for a high pressure in the gas, which results in the need for a thick, but X-ray transparent, window and the high cost of xenon gas. After each exposure the xenon gas must be recovered and repurified; accordingly, a complicated and expensive purification system is required.

SUMMARY OF THE INVENTION

It is an object of this invention to provide a device for recording X-ray images on a low-cost recording material.

It is another object of this invention to provide a device for X-ray recording which permits obtaining sharp-edge images.

It is another object of this invention to provide a device for X-ray recording utilizing a liquid-sensitive electron-emissive material which is air-exposable.

It is another object of this invention to provide an air-exposable X-ray sensitive electrode having a high emissivity with respect to the energy of the X-ray.

In accordance with this invention there is provided an improved device for the electrostatic recording of X-ray images, which comprises an electrode and a sheet of insulating material spaced apart with a gas-filled gap therebetween, an electric field being applied across the gap. The electrode comprises a layer of a fluorescent material and a layer of an air-exposable photoemitting material.

DESCRIPTION OF THE DRAWINGS

The single FIGURE schematically represents a device in accordance with the preferred embodiment.

DESCRIPTION OF THE PREFERRED EMBODIMENT

The device of the FIGURE includes an X-ray source 10 and two electrodes 14, 22. A frame (not shown) is provided to maintain the electrodes 14, 22 spaced apart and with a gap 19 therebetween. The electrode 14 comprises four adjacent layers 15, 16, 17, 18. The layer 15 is made of a light metal transparent to the X-rays (for example, aluminum), and supports the layer 16, made of an ultraviolet-emitting fluorescent material. Layer 17 is made of a material transparent to ultraviolet light (for example, quartz) and supports a layer 18 of a photoelectric material capable of emitting electrons by the action of the ultraviolet light. Layers 17 and 18 should be thinner than layer 16.

The electrode 22 is in the form of a plate of a conductive material. A sheet 21 of insulating material (for example, mylar™, polyester film) is adjacent the electrode 22 and is so mounted as to be easily removed from plate 22.

The ultraviolet-emitting fluorescent material of layer 16 can be, for example, a compound such as barium sulfate doped with lead ($BaSO_4$:Pb), but it is understood that also other compounds having the characteristic of emitting in the ultraviolet spectral region may be used. The photoelectric material of layer 18 can be, for example, cadmium telluride or cesium iodide, or any other photoelectric material whose photoelectric properties are not altered by contact with air.

In the preferred embodiment, the electrode 14 and the sheet of insulating material 21 are exposed to the surrounding atmosphere, so that the gap 19 is filled with air at atmospheric pressure. However, the operation of the device is not altered if the gap 19 is filled with a gas other than air. In such a case, the device shall comprise an envelope enclosing electrodes 14 and 22 and a system for maintaining a desired pressure within the envelope, the value of the pressure being selected as discussed below.

An electric field is applied across gap 19, for example by means of a voltage generator 20 connected between layer 15 and electrode 22. The polarity of the generator 20 shall be such as to accelerate photoelectrons emitted from the layer of the photoelectric material 18 towards the insulating sheet 21.

The value of voltage V of generator 20, the length *d* of gap 19, and the pressure of the gas filling gap 19 shall be such that photoelectrons emitted from the photoelectric material of layer 16 will cause an avalanche effect in the gas filling gap 19. Examples of such values are: a range from 500 to 3000 volts for voltage V; a range from five-tenths of a millimeter to 1 millimeter for length *d*, and 1 atmosphere for the gas pressure.

In the operation, the X-ray source 10 emits a beam 11 of X-rays against an object 12 to be examined. The beam 13 emerging from object 12 is modulated in amplitude in accordance with the differential absorption of X-rays by the various areas of object 12. the modulated X-rays of beam 13 impinge on the electrode 14. They traverse layer 15 without appreciable attenuation and impinge on the fluorescent layer 16. The fluorescent layer 16 absorbs a relevant percentage of the energy of the X-rays of beam 13 and, as a result thereof, emits a large number of photons in the ultraviolet spectrum range. Such photons traverse the transparent layer 17 without appreciable attenuation and impinge on the photoelectric film 18. As a result thereof, the photoelectric film 18 emits photoelectrons in the gap 19. Such photoelectrons are accelerated by the electric field across gap 19 and strike the air molecules in gap 19, creating ion-electron pairs. The newly formed electrons strike other air molecules, causing an avalanche effect in the air of gap 19. As a result thereof, on the insulating layer 21 there is formed an electric charge image whose local intensity is proportional to the corresponding absorption of X-rays by the object 12.

After exposure, the insulating layer 21 is removed and the electrostatic image thereon is developed with conventional xerographic techniques.

The efficiency of electrode 14 (i.e., the number of photoelectrons emitted by the photosensitive layer 18 for each X-ray photon impinging on the electrode 14) is much higher than in the heavy metal electrode used in the prior art electrostatic recording system. This is the result of the combination of the ultraviolet fluorescent layer 16, which multiplies the number of photons in the X-ray beam 15 by converting them from the X-ray to the ultraviolet spectral region, with the ultraviolet-responsive photoelectric layer 18. Accordingly, the intensity of the electrostatic image formed on the insulating sheet 21 is high, resulting in a good quality xerographic reproduction. Due to the edge enhancement characteristic of the xerographic process, the reproduction enhances the contours of the image and is particularly suitable for diagnostic purposes.

While the invention has been described with reference to certain preferred embodiments, many modifications and changes will readily occur to those skilled in the art. Accordingly, the appended claims are intended to cover all such modifications or changes as fall within the sphere and scope of the invention.

What is claimed is:

1. A device for electrostatically recording X-ray images, comprising:

a. an electrode capable of emitting electrons by the action of X-rays impinging thereupon;
b. a body of an insulating material having a surface spaced from said electrode whereby a gap is formed between said surface and said electrode;
c. a gas disposed within said gap;
d. means for applying an electric field across said gap for accelerating said electrons;
e. said electrode comprising a first layer of a fluorescent material capable of emitting photons by the action of X-rays impinging thereupon, and a second layer adjacent said first layer and so disposed as to be impinged by said photons and emitting electrons in response thereto.

2. A device in accordance with claim 1, wherein said first layer is capable of emitting photons substantially in the ultraviolet spectral region and said second layer is made of an ultraviolet-sensitive material capable of emitting photoelectrons by the action of said photons.

3. A device in accordance with claim 2, wherein said ultraviolet-sensitive material comprises a compound selected from the group consisting of cadmium telluride and cesium iodide.

4. A device in accordance with claim 1 wherein said gas comprises oxidizing gases.

5. A device in accordance with claim 4 wherein said gas comprises air.

6. A device in accordance with claim 4 wherein said second layer comprises a material having photoemissive properties in an oxidizing atmosphere.

7. A device in accordance with claim 1 wherein said gas has a pressure of approximately 1 atmosphere.

8. A device in accordance with claim 1 wherein said electric field has a voltage gradient sufficient to produce an avalanche voltage-current characteristic in said gas.

9. An electrode comprising:

a. a first layer of a fluorescent material capable of emitting photons substantially in the ultraviolet spectral region by the action of X-rays impinging thereupon; and
b. a second ultraviolet-sensitive layer adjacent said first layer so disposed as to be impinged by said photons and emitting electrons in response thereto, said ultraviolet-sensitive layer comprising a compound selected from the group consisting of cadmium telluride and cesium iodide.

10. A device for electrostatically recording X-ray images, comprising:

a. a first electrode capable of emitting electrons by the action of X-rays impinging thereupon;

b. a layer of an insulating material spaced from said first electrode whereby a gap is formed between said first electrode and said layer;

c. a second electrode adjacent to said layer;

d. a gas disposed within said gap;

e. means for applying a voltage between said first and second electrodes for accelerating said photoelectrons;

f. said first electrode comprising a first layer of a conductor material, said first layer being transparent to X-rays, and a second layer comprising an ultraviolet-emitting fluorescent material adjacent to said first layer, said second layer being capable of emitting photons substantially in the ultraviolet spectral region by the action of X-rays impinging thereupon through said first layer; and an airexposable photocathode so disposed as to be impinged by said photons and emitting electrons in response thereto.

11. An electrode comprising:

a. a first layer of a fluorescent material capable of emitting photons substantially in the ultraviolet spectral region by the action of X-rays impinging thereupon; and b. a second ultraviolet sensitive layer adjacent said first layer so disposed as to be impinged by said photons and emitting electrons in response thereto, said ultraviolet sensitive layer being a material having photemissive properties in an oxidizing atmosphere.

* * * * *